United States Patent [19]

Steffens

[11] Patent Number: 4,500,040

[45] Date of Patent: Feb. 19, 1985

[54] METHOD AND APPARATUS FOR SEPARATING THE COMPONENTS OF CELLULOSE SANITARY ARTICLES

[76] Inventor: Bert Steffens, Auf der Jaugel 5, D-5470 Andernach 13, Fed. Rep. of Germany

[21] Appl. No.: 386,935

[22] Filed: Jun. 10, 1982

[30] Foreign Application Priority Data

Apr. 19, 1982 [DE] Fed. Rep. of Germany ....... 3214294
Jun. 4, 1982 [EP] European Pat. Off. ........ 82104932.7

[51] Int. Cl.³ .............................................. B02C 19/12
[52] U.S. Cl. ...................................... 241/14; 241/19; 241/24; 241/57; 241/73
[58] Field of Search ........................ 241/73, 24, 27, 74, 241/19, 79.1, 186.2, 28, 189 R, 14, 57, 138, 151, 74, 260.1, 189 A, 261, 146, 69, 46.11

[56] References Cited

U.S. PATENT DOCUMENTS

| | | | |
|---|---|---|---|
| 2,306,857 | 12/1942 | Behnsen | 241/261 |
| 2,705,596 | 4/1955 | Poyser | 241/138 X |
| 2,980,350 | 4/1961 | Lejeune | 241/73 |
| 3,305,183 | 2/1967 | Morden | 241/260.1 |
| 3,978,179 | 8/1976 | Sundhauss | 241/24 X |
| 4,236,676 | 12/1980 | Bialski | |
| 4,303,206 | 12/1981 | Prince et al. | 241/74 X |
| 4,303,501 | 12/1981 | Steffens | |
| 4,420,117 | 12/1983 | Peroutka et al. | 241/69 X |
| 4,460,132 | 7/1984 | Thumm et al. | 241/46.11 |

FOREIGN PATENT DOCUMENTS

| | | |
|---|---|---|
| 185679 | 5/1956 | Austria . |
| 208209 | 3/1960 | Austria . |
| 260750 | 6/1913 | Fed. Rep. of Germany . |
| 153960 | 8/1938 | Fed. Rep. of Germany . |
| 931510 | 7/1955 | Fed. Rep. of Germany ... 241/189 A |
| 2513853 | 10/1975 | Fed. Rep. of Germany . |
| 2704035 | 8/1978 | Fed. Rep. of Germany . |
| 2918345 | 11/1980 | Fed. Rep. of Germany . |
| 2703063 | 9/1981 | Fed. Rep. of Germany . |
| 3214294 | 1/1984 | Fed. Rep. of Germany . |
| 841681 | 6/1981 | U.S.S.R. ............... 241/189 A |

Primary Examiner—Mark Rosenbaum
Attorney, Agent, or Firm—Murray Schaffer

[57] ABSTRACT

Sanitary articles formed of cellulose flock and non-flock carriers or covers are shredded by rotating entrainers, which are arranged in an enclosed housing. The cellulose flock thus separated is removed from the housing under suction through a sieve which only allow the cellulose flock through. The removal is effected before the covers have been shredded to such an extent that they pass through the sieve. The shredded cover material is then removed separately.

5 Claims, 10 Drawing Figures

METHOD AND APPARATUS FOR SEPARATING THE COMPONENTS OF CELLULOSE SANITARY ARTICLES

BACKGROUND TO THE INVENTION

The present invention relates to a process for separating cellulose flocks from their covers in sanitary articles of cellulose. Such flock accumulate as waste during the production of, in particular, panty-diapers, sanitary towels, sick-bed undersheets with covers, such as plastics sheets, tissue, adhesive tapes, rubber bands or the like. The cellulose sanitary articles are delivered into the effective range of entrainers rotating in a housing. The cellulose flock are then released from the entrainers and the flocks released are extracted from the housing separately from the covers which are removed from the effective range of the rotating entrainers. In addition, the invention relates to an apparatus for carrying out this process comprising delivery means for delivering the cellulose sanitary articles into the effective range of the rotating entrainers and removal means for removing and preferably extracting the cellulose flocks released from the housing.

It is known that wood as a raw material is becoming increasingly more scarce so that the products therefrom are becoming increasingly more expensive. One of these products is highly processed cellulose in the form of cellulose flocks of the type required for the production of absorption pads in cellulose-based sanitary articles. The same also applies to plastic sheeting and nonwovens because their chemical raw materials are also subject to regular price increases.

Since a considerable amount of waste accumulates in the production of cellulose-based sanitary articles, it is extremely important for the reasons explained above to recover the raw materials from this waste, which inevitably accumulates in the production of cellulose sanitary articles, to enable raw materials to be saved.

PRIOR ART

The simplest method of doing this is to size-reduce the cellulose-based sanitary articles as a whole so that the cellulose flocks and the plastic fractions are not separated from one another, and to return the raw materials to the production circuit in this size-reduced form. However, since numerous plastic fractions are also size-reduced and become mixed with the cellulose flocks, the quality of the cellulose-based sanitary articles in regard to their absorption pads is adversely affected.

In addition, there are also separation processes which enable the cellulose flocks to be largely separated from their sheet-form covers by mechanical means. Unfortunately, these processes are attended by certain economic and technical disadvantages.

Thus, German Offenlegungsschrift No. 29 18 345 and U.S. Pat. No. 4,303,501 describe a separation process which is based essentially on the vibrating-sieve principle. Since the waste to be treated is extremely bulky, a considerable amount of space is required for carrying out this vibrating-sieve process which is a disadvantage from the economic point of view. In addition, the waste has to be size-reduced before sieving.

In addition, German Pat. No. 2,703,063 describes another separation process in which the cellulose-based sanitary articles are first partly cut up and then delivered at intervals into the effective range of entrainers rotating at a high peripheral speed. In this process, the plastic covers are wound onto the entrainers, the cellulose is released and removed under suction and the covers are subsequently detached from the entrainers, disintegrating in the process, and are removed under suction. This process is inefficient for various reasons because, after only a small quantity of cellulose-based sanitary articles have been fed in, their covers very quickly wrap themselves around the entrainers which thus become ineffectual. For this reason, it is only ever possible to process a small quantity of cellulose-based sanitary articles in each working cycle. Another disadvantage lies in the fact that the working cycle as a whole consists of three steps, the first of which comprises shredding and introducing the shredded cellulose-based sanitary articles into the effective range of the entrainers, the entrainers releasing the cellulose flocks and the covers being wound onto the entrainers; the second step is merely used for removing the flocks under suction; and only then is it possible to carry out the third step in which the covers wound onto the entrainers are shredded and removed under suction. This relatively large number of separate steps inevitably results in a further reduction in efficiency.

Finally, German Offenlegungsschrift No. 27 04 035 describes a separation process which is essentially characterised in that the cellulose-based sanitary articles are first size-reduced in a cutting mill, the cutting mill being equipped at its output end with a sieve which provides for considerable size reduction to the extent required for the process. To enable the shredded material to be taken in through the sieve, the cutting mill is followed by a fan which also provides initially for the further pneumatic transport of the material. As the process continues, a large part of the air present in the mixture of air and material being transported is separated off by means of an air separator. The outlet of the air separator communicates with the interior of a cylindrical sieve in the cylinder axis of which rotate stirrer arms fixedly arranged on a shaft. The cylindrical sieve is mounted in a housing arranged at a distance from the cylindrical sieve. This housing also catches those cellulose flocks which pass through the cylindrical sieve through the movement of the stirrer arms. A mixture of cover debris and cellulose flocks which have not passed through the wall of the sieve is collected at that end of the cylindrical sieve facing the entrance of the cellulose flocks. This mixture is transferred to another sieve assembly identical with the first apart from its mesh width. In this way, several cylindrical sieve assemblies can be arranged in a cascade one behind the other.

This process is attended by considerable disadvantages. For example, the space required to carry it out is even greater than in the vibrating sieve process according to German Offenlegungsschrift No. 29 18 345 and U.S. Pat. No. 4,303,501 cited earlier on. The separation process according to German Offenlegungsschrift No. 27 04 035 comprises at least four separate steps in cases where only a single cylindrical sieve is used. Where several cylindrical sieves are used, the number of separate steps involved increases to seven or more. The first step comprises loading, pre-cutting and removal under suction through the sieve of the cutting mill. In the second step, the air is separated off and the material transported to the interior of the first cylindrical sieve. The third step of the process comprises sieving the materials which are able to pass through the meshes of the sieve. In the fourth step, the mixed materials are collected and transferred to the next cylindrical sieve. Thereafter, the third and fourth steps of the process mentioned above may be repeated several times. However, the difficulty of this process is not only that it requires a considerable amount of space, an even greater disadvantage lies in the fact that, in practice, it is not possible by this process satisfactorily to separate the cellulose flocks from their covers. This is attributable in particular to the fact that the sheet-form covers are pressed onto the inside of the cylindrical sieve because complete separation of the air at the output end of the air separator is not possible as some of the air is required for further transport. This process is also attended by the disadvantage that not only cellulose flocks, but also shredded cover debris pass through the cylindrical sieves in relatively large quantities without the resulting mixture ever being aftertreated. Accordingly, it is not possible satisfactorily to apply this process in practice.

OBJECT OF THE INVENTION

Accordingly, the object of the present invention is to provide a process and an apparatus of the type mentioned at the beginning which take up relatively little space and which have a high level of efficiency, the process being intended to consist of as few separate steps as possible and also to be carried out with the above-mentioned advantages even in cases where there is no preliminary size-reduction step carried out spatially before the actual separation process.

EXPLANATION OF THE INVENTION

Starting out from a process of the type mentioned at the beginning, this object is achieved in accordance with the invention in that the cellulose-based sanitary articles are largely broken up by the rotating entrainers, which are arranged on one or more rotating components, either on their own or in cooperation with stationary entrainer counterparts, and in that the cellulose flocks released are removed under suction through a sieve, either the covers only being size-reduced to such an extent that they do not pass through the sieve, or the cellulose flocks being removed under suction through the sieve before the covers are broken up so finely that they pass through the sieve.

The apparatus according to the invention for carrying out this process is characterised in that the sharp or blunt entrainers, which are movably or fixedly arranged on one or more rotating components, are arranged either on their own or together with stationary, movably or fixedly arranged, sharp or blunt entrainer counterparts and/or designed in such a way that they largely break up the cellulose-based sanitary articles, and in that at least one sieve is arranged completely or partly around the body of rotation formed by the rotation of the entrainers at such a narrow distance therefrom that materials to be separated which are situated on the rough or smooth inside of the sieve can be taken up by the entrainers.

It has surprisingly been found that it is possible by this process and using this apparatus, in which the rotating, fixed or movable entrainers—either on their own or together with the stationary, fixed or movable entrainer counterparts—form a zone of action in the gaps of which the shredded cellulose-based sanitary articles are able to spread out adequately, to break up the covers rather than the covers wrapping themselves around the entrainers and rendering them ineffectual in a short time, as is the case with the process and apparatus according to German Pat. No. 2,703,063 discussed earlier on. As was also found in the course of the studies culminating in the present invention, the effect of this breaking up or disintegration is that the cover debris formed during breaking up of the covers is initially and remains relatively coarse-grained by comparison with the cellulose flocks, so that excellent, substantially quantitative separation of the cellulose flocks from their covers is obtained during removal of the cellulose flocks under suction through a suitable sieve. This was demonstrated by tests carried out with particularly bright-coloured covers. This excellent separation takes place in consequence of another effect not only in the sense that the cellulose flocks separated off are free from cover materials, but also in the sense that the cover material—a plastic—separated off is in turn largely free from cellulose. It has been found that, in contrast to the process according to German Pat. No. 2,703,063, the tissue—a binder-free cellulose paper—is also reduced to fibres in the process according to the invention. Not only does this prevent the tissue material from "contaminating" the cover material, the tissue material is also advantageously used in the production process as a liquid-absorbing fibrous material without any change in the quality of the absorption pad material. Because it is substantially free from cellulose, the cover material separated off may be re-used with very considerable advantage.

These advantages are particularly pronounced in cases where the entrainers are movably arranged on the rotating component, for example on a shaft, in which case a particularly outstanding effect is obtained, even without counterparts for the entrainers.

So far as the above-mentioned zone of action is concerned, it is important to ensure that it is not too confined because an excessively confined zone of action, in which the shredded cellulose-based sanitary articles are unable to spread out sufficiently, would result in blockage and/or in disintegration of the covers into excessively small fragments coupled with a high power consumption of the drive system.

In addition, the process and apparatus according to the invention take up relatively little space despite a relatively high degree of efficiency.

The process according to the invention may be carried out both in batches and also continuously; in the first case, the additional advantage is afforded over the prior art that the process involves only two separate steps, in the first of which the cellulose-based sanitary articles, which preferably are not size-reduced beforehand, are delivered in batches to the entrainers, broken up and the released cellulose flocks removed under suction, whilst in the second step the shredded covers are removed from the effective range of the entrainers before delivery of the next batch of cellulose-based sanitary articles. This second step of the process involves only a brief interruption so that the high degree of efficiency is not impaired.

In cases where the process is carried out continuously, the cellulose-based sanitary articles are continuously delivered in accordance with the invention to the end of a body of rotation which the entrainers form by rotation, are transported axially along the body of rotation during the disintegration process and the disintegrated covers are continuously removed, preferably under suction, at the other end of the body of rotation whilst the cellulose flocks are continuously removed under suction in the intermediate zone between the two ends and optionally at one or both ends of the body of rotation.

Axial transport along the body of rotation may be achieved by correspondingly designing the body of rotation itself and/or by correspondingly arranging the entrainers along the axis of rotation and/or by correspondingly designing the envelope which the housing and the sieve form around the body of rotation. To materialise the first possibility, the body of rotation which the entrainers form by rotation steadily decreases in its diameter and, in particular, is a cone, whereas to materialise the other two possibilities the entrainers are arranged spirally along their axis of rotation and/or spiral guide ridges are arranged at a narrow interval from the body of rotation which the entrainers form by rotation. In the first case, the delivery means open in the vicinity of the minor diameter, whereas a continuous removal means for the disintegrated covers opens in the region of the major diameter. In the last two cases, the arrangement is such that the delivery means open at the beginning of the transport path formed by the spiral arrangement of the entrainers and/or guide ridges whilst a continuous removal means for the disintegrated covers opens at the end of that transport path. In all these cases, the sieve is arranged completely or partly around the body of rotation, preferably between the beginning and the end of the transport path determined by the axial length of the body of rotation.

In cases where the apparatus according to the invention operates in batches, the body of rotation formed by the rotation of the entrainers does not have any axial transporting effect and the delivery means and removal means for the cellulose flocks on the one hand and a removal means for the disintegrated covers on the other hand are designed for alternate, periodic operation.

In every case, the cellulose flocks may be removed under suction through several sieves arranged one behind the other. In addition, it is possible in every case for the delivery means to be formed by an axial delivery means relative to the body of rotation formed by the entrainers. Finally, it is possible in every case to provide a cutting unit either in front of or within the delivery means. The cellulose-based sanitary articles are always broken up and their constituent materials separated in one and the same housing with a minimum space requirement.

The sieve used may be in particular one of the following:

(a) a sheet-metal sieve with a smooth active surface;

(b) a sheet-metal sieve with a rough active surface, in which the webs left after perforation or the peripheral zones (collars) of the perforation are completely or partly deformed, preferably an elongate-hole, round-hole or triangular-bridge-hole sieve or a sieve having rasp perforations in which perforation is obtained by penetration of the material using a pointed mandrel;

(c) a wire sieve of wire netting or wire gauze having a rough surface; or (d) a wire sieve or wire net having a smooth surface obtained for example by rolling or pressing the sieve.

The active surface of the sieve is that surface of the sieve which faces the entrainers and which is also called the inner surface. The expression "smooth" active surface applies to the surface of the webs or bridges between the perforations.

In addition, the apparatus may be constructed in such a way that the counterparts of the entrainers engage or do not engage in the body of rotation formed by the rotation of the entrainers.

Another preferred embodiment is distinguished by the fact that (a) the entrainers are arranged on a flat rotating component and by the fact that the entrainers and/or their counterparts are preferably designed in such a way that their length increases towards the larger diameter; or by the fact that (b) the entrainers are arranged on a conical rotating component, in which case either the conical component or the housing is completely or partly in the form of a sieve; in the latter case, the removal means for the cellulose flocks are preferably arranged in the form of an annular channel on the housing.

BRIEF DESCRIPTION OF THE DRAWINGS

Particularly preferred embodiments of the invention are described in detail in the following and illustrated in principle in FIGS. 1 to 7 of the accompanying drawings, wherein.

Identical or corresponding components are very largely denoted by the same reference numerals in all the Figures of the drawing and, for this reason, will not be re-explained in each case.

DETAILED DESCRIPTION OF THE INVENTION

Figure 1:
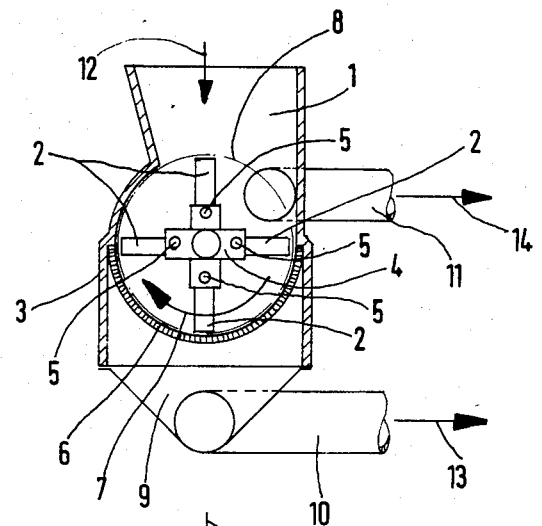
FIG. 1 shows a first embodiment of an apparatus according to the invention which represents a basic version.

Reference will first be made to FIG. 1 which shows a first embodiment of an apparatus enabling cellulose-based sanitary articles to be processed in such a way that the cellulose flocks are separated from the covers.

This embodiment may also be regarded as the basic version of the apparatus according to the invention because it is essentially the simplest embodiment.

The apparatus shown in FIG. 1 comprises delivery means 1 for delivering the cellulose-based sanitary articles (not shown). In the embodiment illustrated, the delivery means 1 are formed by a hopper, although they may also be formed by a cylindrical or other tube. The delivery means 1 may additionally comprise a transporting system (not shown), such as for example an air fan for producing an air stream transporting the cellulose-based sanitary articles, an endless conveyor belt, a chute or the like. The function of the delivery means is to deliver the cellulose-based sanitary articles into the effective range of entrainers 2 which rotate in a housing 3 immediately adjoining the delivery means 1.

The entrainers 2 are movably arranged on a rotating component 4 in the form of a shaft. These entrainers 2 may be formed for example by elongate elements, such as rods, of an impact-resistant material, for example steel. The entrainers 2 are each arranged on the rotating component 4 by means of an entrainer suspension 5 which provides for relative movement between the entrainers 2 and the rotating element 4. This entrainer suspension 5 may be formed by an entrainer bolt which is arranged on each entrainer 2 or on a group of entrainers 2 and which is preferably arranged parallel to the axis of rotation of the rotating component 4, the entrainer or the group of entrainers being able to turn freely about its axis. However, the entrainer suspension 5 may also be formed by an entrainer hinge, in which case each individual entrainer 2 or a group of several entrainers 2 comprises one such entrainer hinge of which the hinge axis preferably extends parallel to the axis of rotation of the rotating component 4. The entrainer hinges may also be formed by universal joints or other joints which provide for rotation in several directions.

Figure 6:
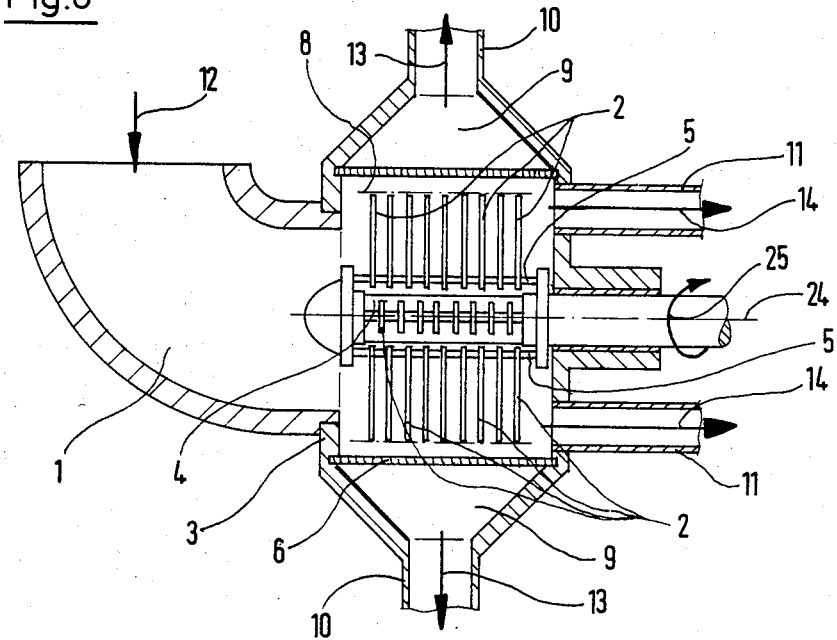
FIG. 6 shows a fourth embodiment of the invention which operates on the batch principle, the apparatus being axially loaded, a cylindrical sieve being arranged around the entrainers or one or more sieve segments being provided.

A sieve 6 is arranged around the body of rotation 8 formed by the rotation of the entrainers 2 in the direction of the arrow 7 in such a way that it extends around half the circumference of the body of rotation 8. The sieve 6 may also extend through an angle of more or less than 180° around the circumference of the body of rotation 8. In particular, it may extend completely around the body of rotation 8 if the construction of the delivery means 1 permits, for example when the delivery means is formed by an axial delivery means, as shown in FIG. 6.

It is important that the entrainers 2 are arranged at such a narrow interval from the circumference of the body of rotation 8 that materials to be separated, i.e. the materials of the cellulose-based sanitary articles, can still be engaged by the entrainers 2 when they are situated on that side of the sieve 6 facing the entrainers which is referred to as the inside. In this connection, it should be borne in mind that this "narrow interval" does not in any way have to be as narrow as, for example, the thickness of the cellulose flocks, but may be equal to or less than the thickness of a wedge of material which consists of the materials to be separated and which the entrainers push along in front of them when the apparatus is in operation, so that it slides past the inside of the sieve 6. The maintenance of this "narrow interval" is extremely important because otherwise the sieve 6 would become blocked soon after the apparatus had been brought into operation.

A removal means 9 for removing the cellulose flocks released from the housing 3 is provided on that side of the sieve 6 which is remote from the entrainers 2 and which is also referred to here as the outside. As illustrated, this removal means 9 may be formed by a funnel and may comprise a pipe 10 for removing the cellulose flocks under suction which opens into the funnel at the tapered end thereof.

In addition, a removal means 11 for the shredded covers (i.e. the cover debris) is provided in such a way that, in relation to the direction of flow of the cellulose flocks released, it opens into the interior of the housing 3 upstream of the sieve 6, preferably in the immediate vicinity of the effective range of the entrainers 2. In the present case, the removal means 11 is formed by a suction pipe.

The practical application of a preferred embodiment of the process for separating the cellulose flocks from their covers will now be described with reference to the mode of operation of the apparatus illustrated in FIG. 1:

(1) In a first step, the cellulose-based sanitary articles to be processed are delivered in one batch to the rotating entrainers 2 by the delivery means 1 in the direction of the arrow 12. The cellulose-based sanitary articles are shredded by the entrainers and the cellulose flocks which they contain are continuously removed under suction by the removal means 9 through the suction pipe 10, as indicated by the arrow 13. During this step of the process, the removal means 11 is not in operation because otherwise the cellulose flocks released would also be withdrawn under suction by this removal means. The first step of the process is continued until virtually all the cellulose flocks have been released, but only for so long that the cover debris does not become too fine, i.e. is still not able to pass through the sieve 6, but instead accumulates in the interior of the housing.

(2) In the second step of the process, the delivery of the cellulose-based sanitary articles is briefly stopped and the shredded covers are removed from the effective range of the rotating entrainers 2 by the removal means 11, as indicated by the arrow 14. To this end, the loading of the apparatus with cellulose-based sanitary articles only has to be interrupted very briefly so that the high level of efficiency of this apparatus is virtually unaffected.

Steps (1) and (2) of the process as described above are continuously repeated in the sequence indicated, enabling a high throughput of cellulose-based sanitary articles for processing to be obtained.

Figure 2:
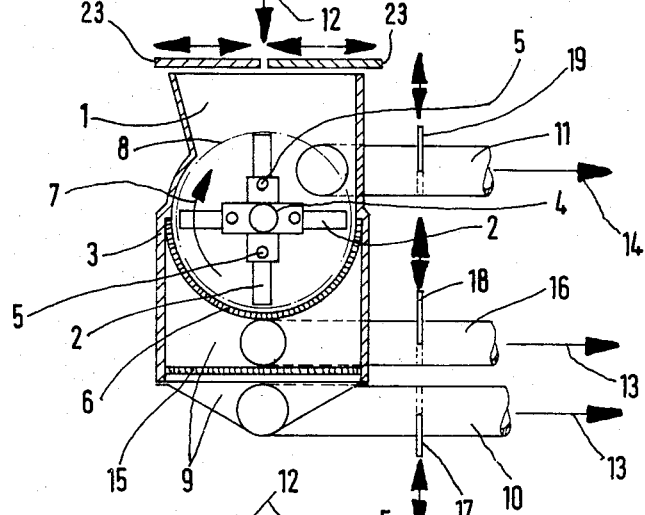
FIG. 2 shows a modification of the basic version illustrated in FIG. 1 in which an additional sieve and several slide valves are provided.

Reference will now be made to FIG. 2 in which—just as in the other Figures of the drawing—identical or similar components, arrows or the like of the type used in FIG. 1 are denoted by the same reference numerals. The apparatus illustrated in FIG. 2 differs from the apparatus illustrated in FIG. 1 in the fact that, to enable the cellulose flocks to be sieved more finely, the sieve 6 is followed by another sieve 15 in the direction of flow of the cellulose flocks. Unlike the sieve 6, which is semicylindrical in shape, the sieve 15 no longer has to be adapted in its shape to the shape of the body of rotation 11, instead it may be flat for example, as shown in FIG. 2. Another suction pipe 16 opens into the space between the two seives 6 and 15, so that a coarse fraction of cellulose flock may be removed under suction through suction pipe 15 whereas a finer fraction of the cellulose flocks may be removed through the suction pipe 10.

In addition, slide valves are provided in the apparatus illustrated in FIG. 2. A first slide valve 23 is arranged in the delivery means 1, comprising two sections which, in the closed position, meet in the middle of the delivery channel formed by the delivery means 1. These sections of the slide valve 23 are designed to move back and forth in the direction of the double arrows visible alongside them. In addition, a slide valve 17 and a slide valve 18 are respectively provided in the suction pipe 10 and in the suction pipe 16. Finally, a slide valve 19 is arranged in the suction pipe 11 directly where it opens into the housing 3 so that no material is able to accumulate in front of the slide valve 19 during rotation of the entrainers 2, resulting in blockage of the suction pipe 11. The slide valves 17, 18 and 19 are designed to move back and forth in the direction of the double arrows indicated alongside them and, on account of the comparatively small diameter of the suction pipes, are each only able to have one moving part, although if desired they could also be made up of two sections displaceable towards and away from one another, like the slide valve 23.

With regard to the mode of operation of the apparatus shown in FIG. 2, it is also pointed out that, when the suction pipe 11 is in operation, at least one of the other slide valves 17, 18 or 23 has to be open in addition to the slide valve 19 because otherwise an excessive reduced pressure would be created in the housing 3 or the air stream available for removing the cover debris under suction would not be strong enough.

Figure 3:
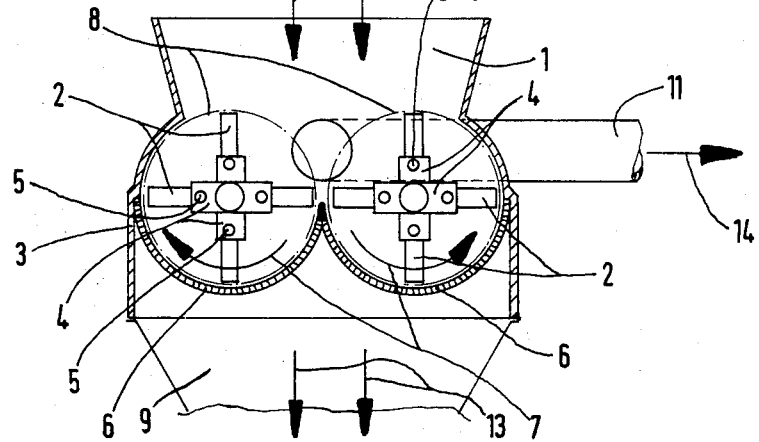
FIG. 3 shows a modification of the basic version illustrated in FIG. 1 in which the rotating entrainers and the rotating component—a shaft on which the entrainers shown in FIG. 1 are movably arranged—are mounted horizontally adjacent one another in a double arrangement.

In the embodiment illustrated in FIG. 3, two rotating components 4 with entrainers 2 are arranged horizontally adjacent one another in such a way that the axes of rotation of the rotating components 4 are parallel to one another and the bodies of rotation 8 are separated from one another by only a narrow interval which, preferably, is substantially equal to the interval separating the body of rotation 8 from the inside of the sieve 6 which, in this case, is provided for both units of the rotating component 4 and the entrainers 2 in the same way as the delivery means 1 and the removal means 9 and 11.

Figure 4:
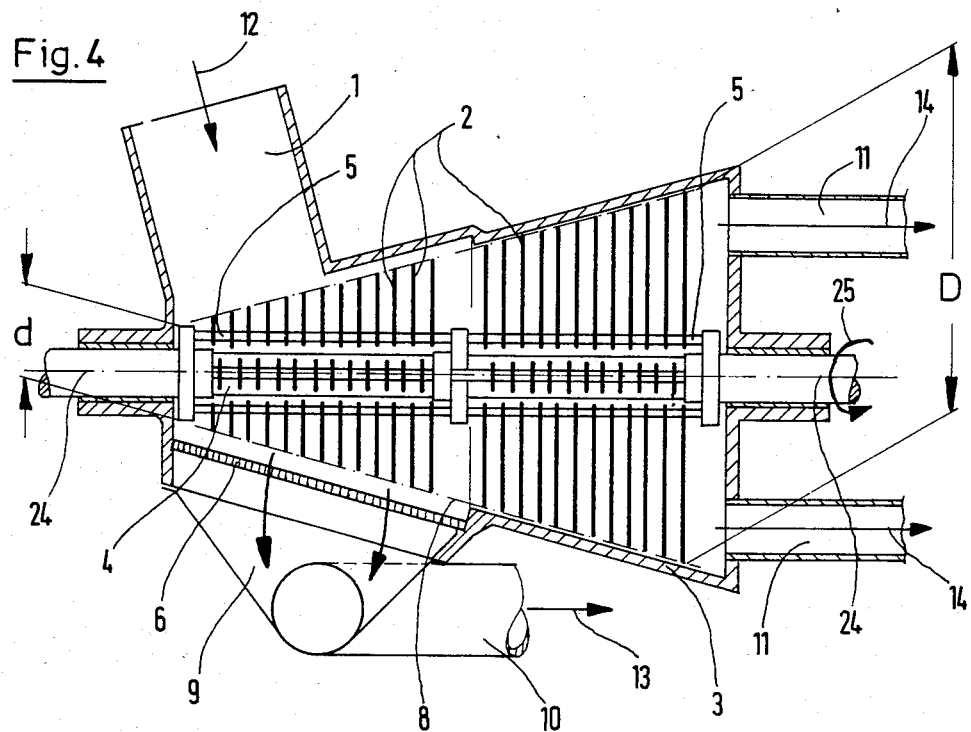
FIG. 4 shows a second embodiment of an apparatus according to the invention which operates continuously, the entrainer ends being conically arranged so that a conical construction is obtained.
Figure 5:
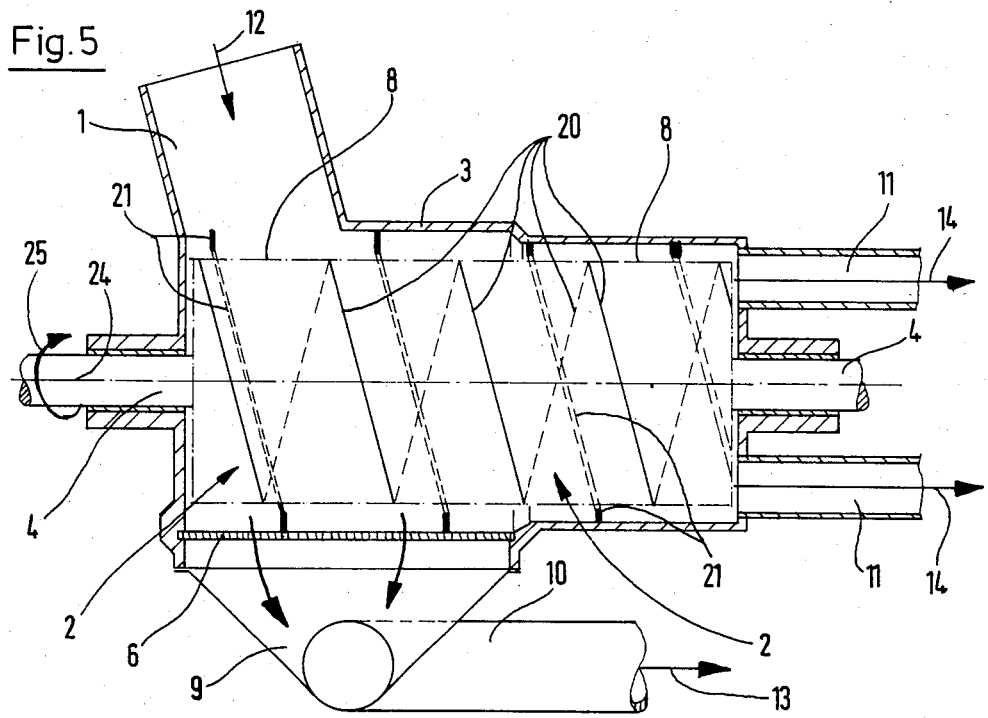
FIG. 5 shows a third embodiment of an apparatus according to the invention which also operates continuously; in this case, however, the entrainers form a spiral arrangement and/or a spiral arrangement of guide ridges is provided on the inner wall of the housing, FIG. 5 showing both the spiral arrangement and also the guide ridges.

Whereas FIGS. 1 to 3 show apparatus which are operated in batches, FIGS. 4 and 5 show two embodiments of continuously operated apparatus for separating the cellulose flocks from their covers.

Referring first to FIG. 4, the body of rotation 8 formed by the rotation of the entrainers 2 is a cone. The housing 3 is adapted to this conical form. The delivery means 1 for delivering the cellulose-based sanitary articles opens in the vicinity of the small cone diameter d, whilst a continuously operating removal means 11 in the form of preferably several suction pipes opens in the vicinity of the large cone diameter D. Because the cover debris is thrown outwards by the rotation of the entrainers 2, the openings of the suction pipes in question are situated near the periphery of the body of rotation 8. The sieve 6 is arranged at least partly around the body of rotation 8 between the small and large cone diameters d and D at a distance therefrom, as was explained with reference to the embodiment illustrated in FIG. 1 and which also applies to all other embodiments. The removal means 9 with the suction pipe 10 for the cellulose flocks is provided on the outside of the sieve 6. In the process carried out using this apparatus, the cellulose-based sanitary articles are continuously introduced at 12 into the vicinity of the small cone diameter d. During the shredding of the cellulose-based sanitary articles, the conical body of rotation 8 transports the materials axially along its length to the vicinity of the large cone diameter D. At the same time, the shredded cover debris is continuously removed under suction by the removal means 11, as indicated at 14. At the same time, the cellulose flocks are continuously removed under suction through the sieve 6, as indicated at 13.

Since the apparatus shown in FIG. 4 is operated (quantity of material delivered per unit of time, rotational speed of the rotating component, etc.) and constructed (sieve) in such a way that the cover debris is unable to pass through the sieve 6, it is also possible to construct the sieve 6 in such a way that, in contrast to the illustration in FIG. 4, it extends over the entire axial length of the body of rotation 8.

The embodiment illustrated in FIG. 5 operates continuously in basically the same way as the embodiment illustrated in FIG. 4, but differs from that embodiment in the fact that the body of rotation 8 formed by the rotation of the entrainers 2 is not conical, so that the transport of the processed materials in the axial direction attributable to the conical form of the body of rotation 8 in FIG. 4 is obtained otherwise. According to FIG. 5, the transport of the processed materials in the axial direction is obtained by the fact that the entrainers which have not been shown individually in FIG. 5 are arranged spirally along their axis of rotation, as indicated by the sprial lines 20. In addition, spiral guide ridges 21 are arranged on the inner wall of the housing 3 and optionally on the inside of the sieve 6 at a narrow interval from the body of rotation 8 formed by the rotation of the entrainers. In this way, the materials being processed are also transported axially from the delivery means 1 to the removal means 11 for the cover debris, so that the apparatus shown in FIG. 5 otherwise corresponds in its structure to the apparatus shown in FIG. 4.

It is pointed out that, basically, the spiral arrangement of the entrainers or the arrangement of the guide ridges 21 may in itself be sufficient for producing an adequate axial transporting effect, so that these two measures need not necessarily be combined. On the other hand, it is also possible in the apparatus shown in FIG. 4 to provide suitable guide ridges 21 in order to intensify the axial transporting effect.

FIG. 6 shows an embodiment of a batch-type apparatus which is loaded axially because, in this case, the delivery means 1 opens axially into the housing 3 relative to the rotating component 4. In this way, it is possible to construct the sieve 6 in such a way that it extends over the entire circumference of the body of rotation formed by the rotation of the entrainers 2, so that the cellulose flocks released may be optimally removed under suction through several suction pipes 10 which are distributed around the circumference of the sieve 6. Similarly, the cover debris may also be optimally removed under suction through the suction pipes 11 which are arranged around the circumference of the body of rotation 8.

The type of embodiment shown in FIG. 6 may of course also be applied to the continuous apparatus shown in FIGS. 4 and 5.

Figure 7:
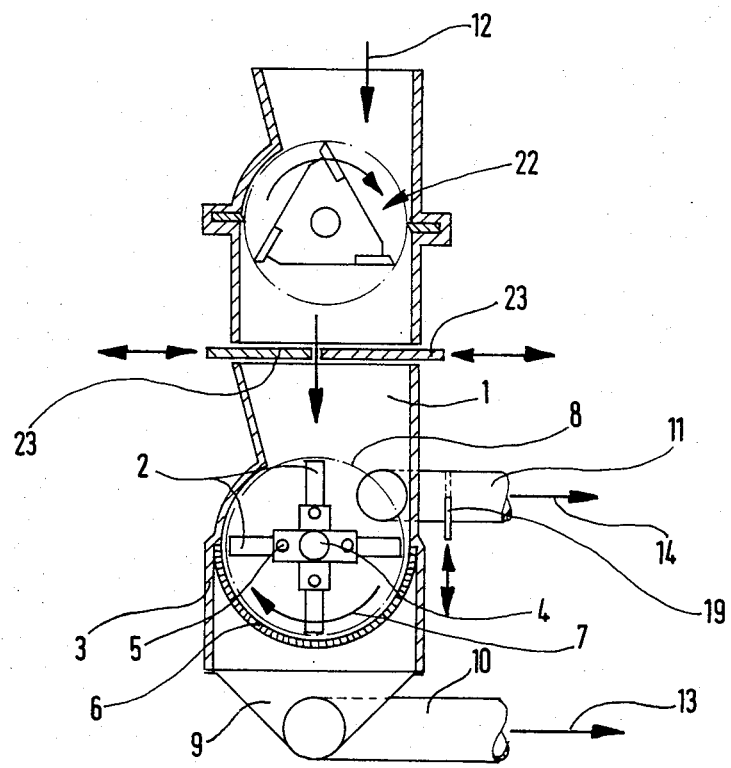
FIG. 7 shows a combination of a cutting unit known per se which is arranged immediately in front of the basic version shown in FIG. 1, but which may also be arranged immediately in front of any of the other versions of the apparatus according to the invention; the cutting unit may also be set up remote from the actual apparatus according to the invention, in which case the cellulose-based sanitary articles pre-shredded by the cutting unit may be transported by a conventional mechanical or pneumatic system.

Finally, FIG. 7 shows a combination of the apparatus illustrated in FIG. 1 with a standard cutting unit 22. This cutting unit may be for example of the type illustrated and described in German Offenlegungsschrift No. 27 04 035, in other words the cellulose-based sanitary articles are subjected to preliminary size reduction. In addition, a slide valve 23 is provided between the cutting unit 22 and the underlying apparatus separating the cellulose flocks and the covers, another slide valve 19 being provided in the suction pipe 11 for the cover debris. The slide valves 19 and 23 may otherwise be arranged and constructed in the same way as described with reference to FIG. 2.

The cutting unit 22, which may also be provided at a distance from the apparatus for separating the cellulose flocks from their covers, in which case the pre-shredded cellulose-based sanitary articles are transported between the two apparatus by standard mechanical or pneumatic transporting systems, may also be arranged in front of any of the other apparatus, particularly the apparatus shown in FIGS. 4 or 5.

The axis of rotation of the rotating components 4 is denoted by the reference 24, the reference 25 denoting an arrow indicating the rotation of the rotating components.

It is pointed out that the features of the various apparatus, where they are not mutually exclusive, may be combined with one another. For example, the arangement of several sieves as illustrated in FIG. 2 may also be provided in the other apparatus and it is even possible to arrange more than two sieves one behind the other in order to be able to obtain even more different fractions of cellulose flocks.

Figure 8:
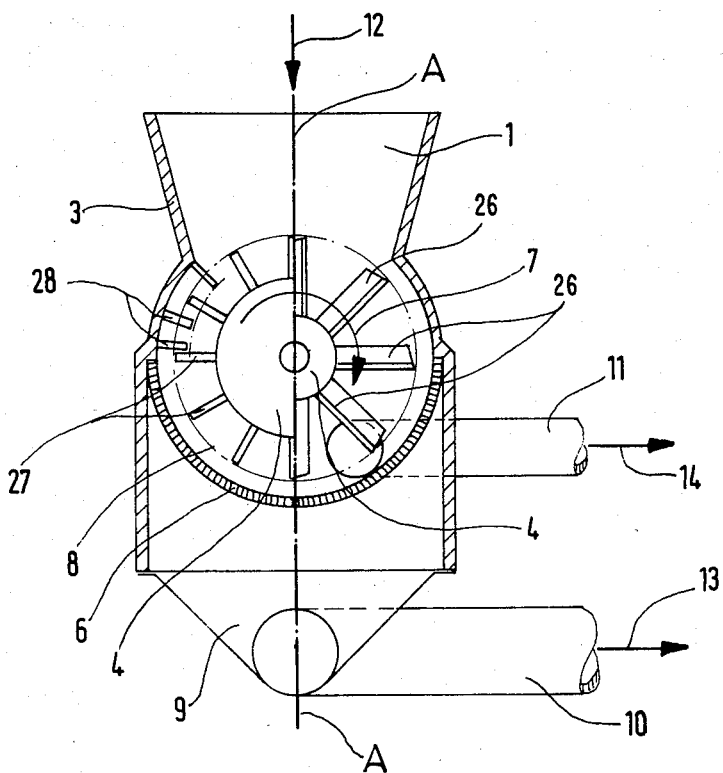
FIG. 8 shows fifth and sixth embodiments of the invention which differ in regard to the entrainers and in regard to the provision of counterparts for the entrainers, these different components being shown on either side of FIG. 8.

FIG. 8 shows a fifth embodiment of which that section in which the covers are shredded is only half-shown on the left of the line A—A. A rotating component 4 with rigid entrainers 27 which may be completely blunt, being made for example of round material, is provided in the housing 3 which is identical with or similar to the housing illustrated in FIG. 1. Counterparts 28 for the entrainers are fixedly arranged on the housing 3 and/or on the sieve 6 in a staggered relationship to the fixed entrainers 27 so that they do not come into direct contact with the entrainers 27.

In cases where the sieve 6 has a rough surface on that side facing the entrainers 27, counterparts 28 for the entrainers are not absolutely essential. The circumference of the body of rotation 8 is kept so large that cellulose-based sanitary articles are unable to wrap themselves around the body of rotation 8. This result may also be achieved by arranging a cutting unit 22 in front and/or by a high peripheral speed and/or by means of the counterparts 28 for the entrainers.

In addition, FIG. 8 shows a sixth embodiment of which that part differing from the fifth embodiment is half-shown on the right of the line A—A. In this case, the rotating component 4 is provided with fixed blade-like entrainers 26 which may also cooperate with counterparts 28.

The apparatus shown in FIG. 8 operate in batches.

Figure 9:
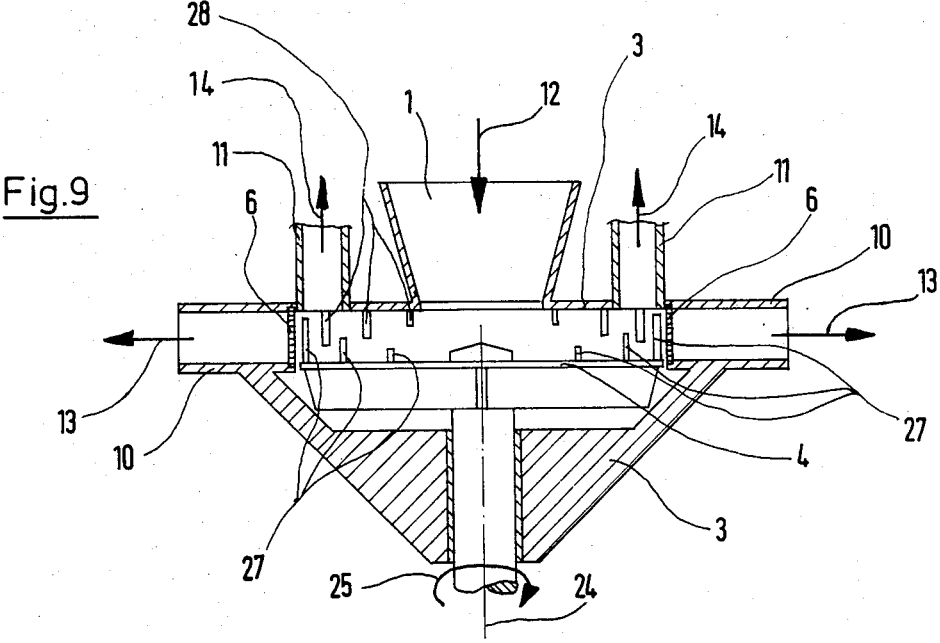
FIG. 9 shows a seventh embodiment of the invention.

In the embodiment shown in FIG. 9, fixed entrainers 27 are arranged on a flat rotating component 29, the length of the fixed entrainers 27 preferably increasing in the direction of increasing diameter. The fixed counterparts 28 for the entrainers are arranged staggered and with their length increasing in the same direction and also in such a way that they project into the body of rotation formed by the rotation of the entrainers. The apparatus operates in batches.

Figure 10:
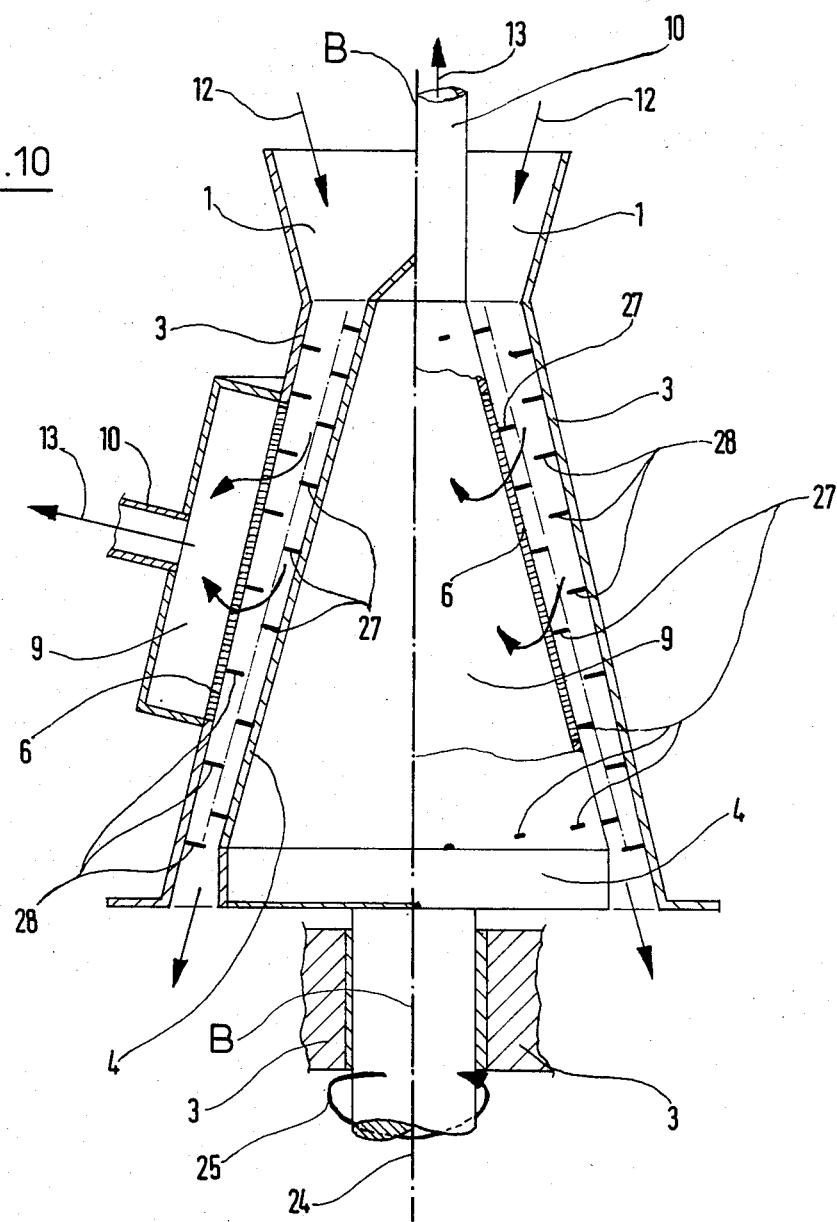
FIG. 10 shows eighth and ninth embodiments of the invention on either side of the centre line.

FIG. 10 shows on either side another two embodiments which correspond in principle to FIG. 9, but in which a longer effective range for a relatively small diameter is obtained by the conical shape of the rotating component 4.

In the embodiment shown on the left of the line B—B, the rotating component 4 is provided with fixed entrainers 27, fixed counterparts 28 for these entrainers being arranged on a housing 3. The housing 3 is completely or partly in the form of a sieve 6, beginning in the region of the small cone diameter. The removal means 9 is preferably arranged on the housing 3 in the form of an annular channel. The cone angles of the rotating component 4 and the housing 3 may be different.

In the embodiment shown on the right of the line B—B, the rotating component 4 is partly or completely in the form of a sieve 6 beginning at the small diameter of the cone. By displacing the rotating component 4 along its axis of rotation 24, the width of the gap which is formed by the inner cone and the outer cone, i.e. between the housing 3 and the rotating component 4, may be adjusted within limits. The apparatus operates continuously.

I claim:

1. A process for separately recovering the flock and non-flock components in cellulose-based sanitary articles obtained as waste in the production of panties, diapers, sanitary towels, sick-bed undersheets, and the like, being a composite of cellulose flock and a non-flock carrier formed of plastic, cellulose or rubber sheets, tissues, adhesive tapes, rubber bands and the like, said process comprising the steps of:
   (a) delivering the sanitary articles into a chamber having a plurality of rotatable entrainers;
   (b) causing said entrainers to break up the sanitary articles so as to provide a mixture of loose cellulose flock and shredded non-flock carrier material;
   (c) removing under effect of a first suction source acting through a sieve the loose cellulose flock formed in said chamber prior to the time said non-flock carrier is shredded so finely that the carrier shreds pass through the sieve; and
   (d) removing under a second suction source acting in the chamber, the non-flock carrier shreds.

2. The process according to claim 1 wherein the shredded non-flock carrier material is removed from in front of said sieve.

3. The process according to claim 1, where the sanitary articles are delivered in successive batches to said chamber, and each batch is broken up and the flock cellulose and the shredded carrier material are removed from the chamber before the next batch is delivered.

4. The process according to claim 1, wherein the sanitary articles are fed in a continuous stream to one end of said chamber, transported through said chamber to the other end while being broken up and the shredded carrier material is continuously removed at the other end of the chamber whilst the cellulose flock is continuously removed in an intermediate zone between the two ends.

5. The process according to claim 1 including the step of passing said cellulose flock through a second sieve after removal from said chamber.

* * * * *